Sept. 25, 1956  R. C. RUMBLE  2,764,024
APPARATUS FOR DETERMINING WALL TEMPERATURE OF CASING
Filed Jan. 7, 1955

INVENTOR.
Robert C. Rumble,
BY
ATTORNEY

United States Patent Office

2,764,024
Patented Sept. 25, 1956

2,764,024

APPARATUS FOR DETERMINING WALL TEMPERATURE OF CASING

Robert C. Rumble, Houston, Tex., assignor, by mesne assignments, to Esso Research and Engineering Company, Elizabeth, N. J., a corporation of Delaware Application January 7, 1955, Serial No. 480,320

1 Claim. (Cl. 73—362)

The present invention is directed to apparatus for determining the wall temperature of a well casing. More particularly, the invention is directed to an apparatus for lowering in a well casing for determining the temperature of the wall of the casing. In its more specific aspects, the invention is directed to apparatus for determining temperature anomalies on the wall of a well casing.

The present invention may be briefly described as apparatus for determining the wall temperature of a well casing. The apparatus comprises a weighted electrically insulated body member which is molded on one side to have a curvature corresponding to the curvature of the casing. Means such as a spring loaded follower wheel is attached to the body member for positioning the body member into contact with the wall of the casing. Arranged in the body member in the side having a curved surface is a temperature detecting means comprising a high heat conductivity metallic block member in which is embedded a sensitive temperature element, such as a thermocouple or a thermistor. The metallic block member also has a curvature or curved surface on its exterior exposed surface corresponding to the curvature of the casing.

Electrical conducting means are electrically connected to the temperature detecting means and to a display means, such as a sensitive recording current meter, which will display a value indicative of the temperature of the wall of the casing.

A problem exists in oil and gas wells in that frequently fluid migration between strata behind the casing is obtained. To locate the level of fluid migration, the well in which the fluid migration is suspected is usually shut in for a number of hours and a temperature survey is run in the enclosed fluid column in the well in an effort to detect temperature anomalies which might be indicative of fluid flow on the casing exterior.

Past experience has shown that temperature anomalies in fluid columns are rather ill defined as to depth which is probably due in part to convection currents in the fluid caused by external cooling or heating of the casing. The present invention solves this problem and is quite useful in determining definitely the boundaries of any portion of casing in which exists an anomalous temperature.

The present invention will be further illustrated by reference to the drawing in which.

Figure 1:
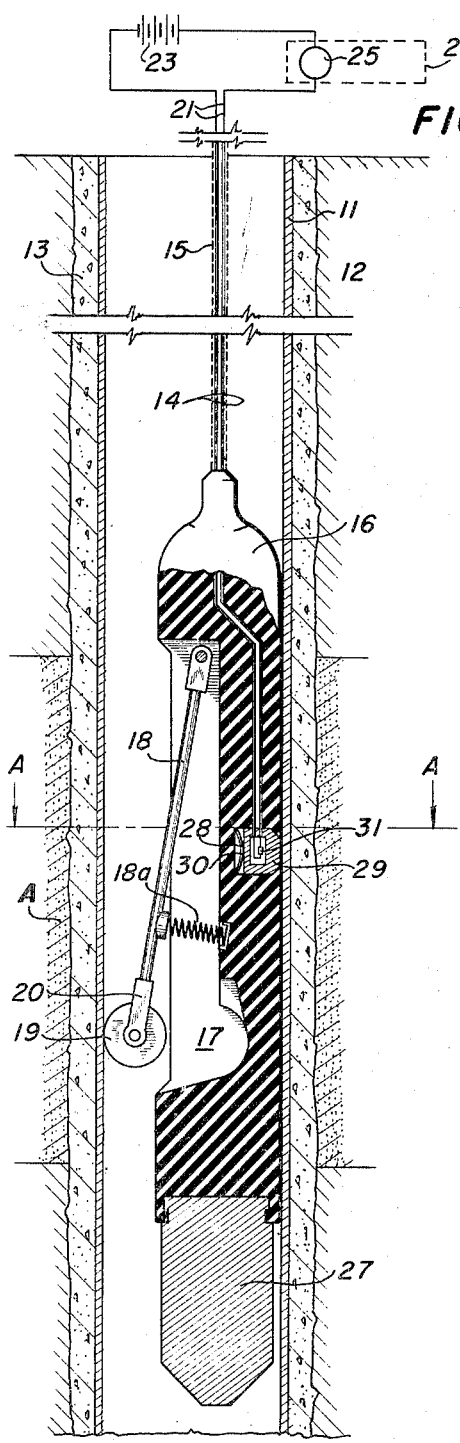
Fig. 1 is a sectional view of the apparatus lowered into a well casing and positioned into contact therewith.

Referring now to the drawing in which identical numerals will be employed to designate identical parts, numeral 11 designates a well casing which has been cemented in well 12 with primary cement 13. The well 12 has penetrated a stratum A and fluid flow is suspected back of the casing 11 due perhaps to a faulty cementing job in setting the primary cement 13. Arranged in the casing 11 on a conductor cable 14 having a sheath 15 is an insulated body member 16 which is constructed of rubber or other insulating material. The body member defines a recess 17 and attached to the body member 16 in recess 17 by an arm 18 is a follower wheel 19 carried by yoke 20 which is attached to the arm 18. The arm 18 is biased outwardly from recess 17 by spring 18a.

The electrical conductor cable 14 is provided with conductors 21 which lead to the earth's surface 22 through cable 14 and are connected to a battery 23 and to a recording current meter 24 provided with an indicating dial 25. The lower end of the body member 16 is provided with weight section 27 which allows the body member 16 to be positioned in the well in a vertical position.

Arranged in the body member 16 on a side opposite the recess 17 is a smaller recess 28 in which is arranged a metallic block member 29 which is biased outwardly from the recess 28 by a spring 30. Embedded in the metallic plug member 29 is a thermistor 31 which is connected electrically to the conductors 21.

Figure 2:
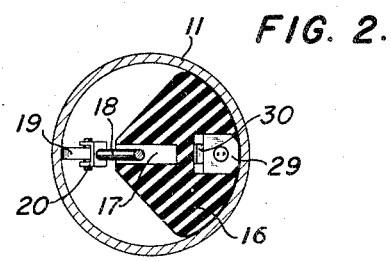
Fig. 2 is a view taken along the lines A—A of Fig. 1.

It is to be noted from Fig. 2 that the curvature of the body member 16 on the side in contact with the casing 11 corresponds in curvature to the curvature of the casing. Likewise, the curvature of the block member 29 is the same as the curvature of the casing 11 to allow the body member 16 and the block member to be positioned directly in contact with the wall of the casing 11 isolated from the fluid in the well.

Figure 3:
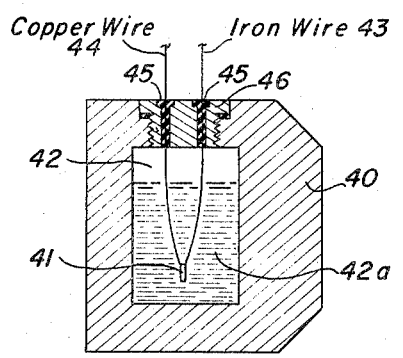
Fig. 3 illustrates a thermocouple in the metallic block.

Referring now to Fig. 3, a block member 40 has a thermocouple 41 arranged therein for indicating the temperature of the wall of the casing. Thermocouple 41 may be a copper-iron thermocouple and is arranged in a cavity 42 in block member 40 which contains a body of a non-electrolyte 42a such as a silicone fluid, a heavy hydrocarbon such as white oil, a non-volatile heavy polyether, and the like. The thermocouple 41 has an iron lead in wire 43 and a copper lead in wire 44. Wire 43 connects to steel sheath 15 and wire 44 connects to conductor 21. Lead wires 43 and 44 are carried through electrically insulating pressure seals 45 in a threaded section 46 which allows access to cavity 42 and thermocouple 41.

Figure 4:
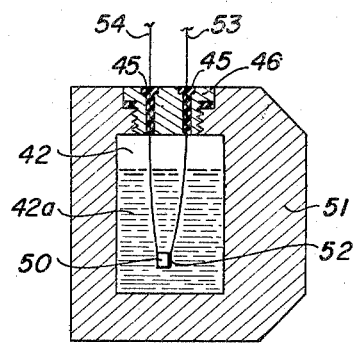
Fig. 4 illustrates a thermistor in the metallic block.

In Fig. 4 a thermistor 50 is provided in a metallic block member 51 for indicating the temperature of the casing wall. Thermistor 50 includes a thermistor head 52 arranged in cavity 42 which contains a body of non-electrolyte 42a such as described supra. Thermistor 50 is connected by lead-in wires 53 and 54 which are carried through electrically insulating seals 45 in threaded section 46 to conductors 21.

The non-electrolyte solution or body 42a serves as a heat transfer medium in the cavity 42 to improve the heat transfer to the sensitive temperature element in blocks 40 and 51 as shown. Similar arrangements may be used for block member 29 in Figs. 1 and 2.

The cavities 42 may be quite small and may have a diameter of about ¼ inch. Smaller cavities than those of this diameter may be provided.

The device of the present invention operates as follows:

The apparatus as shown in Figs. 1 and 2 would be connected to the electrical conductor cable 14 and lowered into the casing 11 to determine the anomalous temperature. As the body member 16 is lowered in the well, the follower wheel 19 is biased outwardly from the recess 17 by the biasing means, such a spring 18a, which causes the follower wheel to be positioned against the wall of the casing and to position the curved side of the body member 16 against the opposite side of the wall of the casing as shown. By molding the rubber body member 16 and the block member 29 to a curvature corresponding to the curvature of the casing, the fluid in the casing is isolated from the wall and the block member 29 is in contact therewith as the device is lowered or raised in the casing. The block member is constructed of high heat conductivity metal in which is embedded a thermistor or the like. The thermistor is an electrical resistor element which is extremely resistance sensitive to small temperature changes. The metallic block member which is biased into contact with the wall of the casing conducts heat readily to and from the casing wall and serves to protect the thermistor. With the instrument at a given depth in the casing, the metallic block member readily assumes the casing temperature at the particular level independent of the temperature of any fluids in the well at that point. With the thermistor arranged in series with the electrical conductors in the cable, and with a constant voltage source and a sensitive recording current meter, small changes in temperature of the thermistor will cause corresponding changes in the current flow through the circuit which are displayed on the meter 25 which is an indication of the temperature of the wall of the casing.

In practice the device of the present invention is run into wells which are shut in and in which temperature anomalies may have been noted in the fluid column by conventional methods. The device of the present invention defines the boundaries of the anomalous areas or zones more clearly than heretofore and allows precise location of the anomalous temperature zones such that remedial work may be performed to shut off any leakage of fluid back of the casing.

The present invention is not limited to defining precisely the zones of temperature anomalies which have been located by other means since the present invention may be employed to define the anomalous temperature zones directly.

The apparatus is also useful in determining changes in temperature gradient on small distances along the wall of the well casing.

The present invention has considerable utility in operations such as have been described.

The thermistor described and illustrated in the present invention has been described in more detail in a paper entitled "Use of thermistors in precise measurement of small temperature differences," by R. H. Müller and H. J. Stolten, Analytical Chem., vol. 25, No. 7, page 1103.

While the block member 29 has been illustrated as constructed of brass, other high heat conductivity metals, such as aluminum, copper, bronze, and silver may be employed.

The nature and objects of the present invention having been completely described and illustrated, what I wish to claim as new and useful and to secure by Letters Patent is:

Apparatus for determining the wall temperature of a well casing which comprises, in combination, a rubber body member having a cavity therein opening at the surface of said member and adapted to be inserted in a well casing with a portion of the surface of said member through which said cavity opens in contact with a portion of the inner surface of said casing, the first said portion being shaped to fit the conformation of the second said portion, a weight attached to the lower end of said body member, a spring biased follower wheel attached to said body member and arranged to urge said portions into contact when said body member is in said casing, a high heat conductivity metallic block member in said cavity, biasing means arranged to urge said block member out of said cavity, so as to cause said block member to contact the casing surface when the body member is in said casing, a thermistor in said block member in heat conducting relation therewith, electrical conducting means connected to said thermistor, and display means electrically connected to said conducting means for displaying a value indicative of the temperature of said wall.

References Cited in the file of this patent
UNITED STATES PATENTS

| | | |
|---|---|---|
| 1,156,317 | Sontos et al. | Oct. 12, 1915 |
| 2,379,317 | Picciano | June 26, 1945 |
| 2,590,982 | Long | Apr. 1, 1952 |
| 2,708,155 | Buckley et al. | May 10, 1955 |